US007548202B1

(12) United States Patent
Jennings (10) Patent No.: US 7,548,202 B1
(45) Date of Patent: Jun. 16, 2009

(54) DOPPLER RADIO DIRECTION FINDING ANTENNA

(75) Inventor: William C. Jennings, Iowa City, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 222 days.

(21) Appl. No.: 11/511,565

(22) Filed: Aug. 29, 2006

(51) Int. Cl.
 *G01S 3/52* (2006.01)
(52) U.S. Cl. ..................................... 342/418
(58) Field of Classification Search ............... 342/418
 See application file for complete search history.

(56) References Cited

U.S. PATENT DOCUMENTS

| 3,144,646 | A | * | 8/1964 | Breithaupt | .................. | 342/105 |
| 4,037,540 | A | * | 7/1977 | Keydel | ....................... | 102/214 |
| 6,020,854 | A | * | 2/2000 | Jagnow et al. | .............. | 343/705 |
| 7,336,234 | B2 | * | 2/2008 | Taguchi et al. | .............. | 343/773 |

OTHER PUBLICATIONS

"Low Cost Competent Munitions" [online], [retrieved on Jul. 24, 2006]. Retrieved from the Internet: <URL:http://www.globalsecurity.org/military/systems/munitions/cm-gps.htm>.

* cited by examiner

*Primary Examiner*—Thomas H Tarcza
*Assistant Examiner*—Nga X Nguyen (57) ABSTRACT

A radio direction finding antenna is disclosed. A dielectric material is configured to rotate about an axis of rotation. The dielectric material has a first conductive surface. A radiating element or array of radiating elements are disposed within the dielectric material and are electrically isolated from the first conductive surface. The radiating element or array of radiating elements are positioned a distance away from the axis of rotation and are configured to be resonant at a predetermined frequency in the case of a single radiating element or various frequencies in the case of an array of radiating elements. Rotation of the dielectric material and radiating element or array of elements about the axis of rotation causes a Doppler effect in signals received by the radiating element or array of elements. An artillery fuse incorporating the radio direction finding antenna is also disclosed.

16 Claims, 6 Drawing Sheets

DOPPLER RADIO DIRECTION FINDING ANTENNA

FIELD OF THE INVENTION

The invention relates to radio direction finding antennas, and more particularly, to radio direction finding antennas usable in environments having high spin rates.

BACKGROUND OF THE INVENTION

Smart munitions have improved the effectiveness of military operations. The high precision and reliability of these munitions have optimized kill ratios and have minimized collateral damage to noncombatants. An example of the communications system enabling smart munitions is shown in U.S. Pat. No. 6,020,854 to Jagnow, et al., the disclosure of which is incorporated by reference herein in its entirety. According to Jagnow, a fuse onboard an artillery shell includes a monopole antenna disposed along the axis of rotation of the artillery shell. The antenna is configured to receive location signals, such as global positioning system (GPS) signals, from orbiting satellites or other sources. Control means, such as retractable flaps, are controlled by circuitry within the artillery shell to adjust the trajectory of the shell during flight.

Because of the effectiveness of smart munitions using GPS for range correction, it is expected that adversaries will try to disrupt L-band GPS signals using ground-based, sea-based or airborne jammers. Effective GPS signal jamming denies the artillery shell the information necessary for precision operations. Therefore, it is important to know whether an adversary is attempting to jam the signal. It would also be very desirable to know the location of a jammer by locating its counter attack or counter measure (CM) radar (e.g. C or S-band radar) so the jammer and/or radar system could be monitored or neutralized. A radio direction finding (RDF) system aboard the munition could be used to detect CM radar signals and locate the source thereof. This would provide the munition with counter counter measure (CCM) capability and mitigate jamming in target approach. An RDF system to detect a jammer's CM radar system that could be operated without risk to friendly personnel is greatly needed. Also needed is an RDF system that can be used to detect and locate the sources of other types of communications in the C and/or S bands, such as satellite communication data links, information friend-or-foe (IFF) systems, or the like.

One type of RDF technology takes advantage of a well-known principle called the Doppler effect. A change in frequency, known as a Doppler shift, occurs in a radio signal when a signal source and sensor move with respect to each other. The shift is proportional to the relative speed difference between them. In a Doppler RDF system a rotating sensor experiences a predictable phase shift from an approaching signal as the sensor moves along a circular path. In accordance with the Doppler effect, the frequency of the carrier signal increases as the sensor moves along its circular path toward the carrier signal source, and the frequency decreases as the sensor moves away from carrier signal source. Thus, the source's carrier signal is frequency modulated with the rotation of the sensor. By differentiating the instantaneous amplitude of the carrier and filtering out the DC carrier frequency component, a demodulated Doppler signal is obtained. The demodulated Doppler signal phase is referenced to the antenna rotation frequency to determine the bearing.

Practically, to obtain an easily measured Doppler shift, a high rotational sensor speed is required. Due to the practical limitations of rotating an antenna at high speed, many RDF antenna systems use a fixed array of antennas and a rotational mechanical switch, or an RF electrical switch circuit to commutate the circular array of antennas to a central feed point. Such solutions may be impractical when rotating at extremely high rates or launched at extremely high accelerations, as is typically required of an artillery shell during launch and flight. Furthermore, these solutions are not optimal for the small size constraints of an artillery fuse, and may be too cost-prohibitive to be used in an artillery fuse that by design is intended to be used only once. When physical size, weight and power are design constraints, or a rugged, efficient low cost RDF system is needed, such as the requirements for antenna systems installed within an artillery fuse, another approach is needed.

It is therefore an object of the invention to provide an RDF system that can be used to detect a GPS jammer's CM radar system without endangering friendly personnel, thus providing CCM capability onboard smart munitions.

It is another object of the invention to provide an RDF system that can be used to detect and locate other types of communications or radars in the C and/or S bands.

It is another object of the invention to provide an RDF system that can be used in an environment having extreme spin or roll rates.

It is another object of the invention to provide an RDF system that can be embedded in an artillery fuse.

A feature of the invention is a monopole antenna having a radiator disposed parallel but separate from the axis of rotation of a spinning object.

An advantage of the invention is an RDF system that can survive extreme accelerations and high roll rates, such as those found in an artillery fuse.

Another advantage is that the RDF system is inexpensive and easy to manufacture.

Still another advantage is that the RDF system can be tailored to function at various frequencies in the electromagnetic spectrum.

SUMMARY OF THE INVENTION

The invention provides a radio direction finding antenna. A dielectric material is configured to rotate about an axis of rotation. The dielectric material has a first conductive surface. A radiating element is disposed within the dielectric material and is electrically isolated from the first conductive surface. The radiating element is positioned a distance away from the axis of rotation and is configured to be resonant at a predetermined frequency. Rotation of the dielectric material and radiating element about the axis of rotation causes a Doppler effect in signals received by the radiating element.

The invention also provides an artillery fuse. A dielectric material is configured to rotate about an axis of rotation. The dielectric material has a first conductive surface. A radiating element is disposed within the dielectric material and is electrically isolated from the first conductive surface. The radiating element is positioned a distance away from the axis of rotation and is configured to be resonant at a predetermined frequency. Rotation of the dielectric material and radiating element about the axis of rotation causes a Doppler effect in signals received by the radiating element.

The invention further provides a method of detecting a location of a source of an electromagnetic signal. An antenna is located in a rotating projectile. The antenna includes a monopole radiating element disposed a distance from a rotation axis of the rotating projectile. The electromagnetic signal is detected using the monopole radiating element. The detected electromagnetic signal is modulated by the rotation of the monopole radiating element. A positioning signal transmitted from a position signal source is detected. A position of the rotating projectile is derived using the positioning signal. The location of the source of the electromagnetic signal is determined using the derived position of the rotating projectile and the modulated detected electromagnetic signal.

DETAILED DESCRIPTION OF THE DRAWINGS

Figure 1:
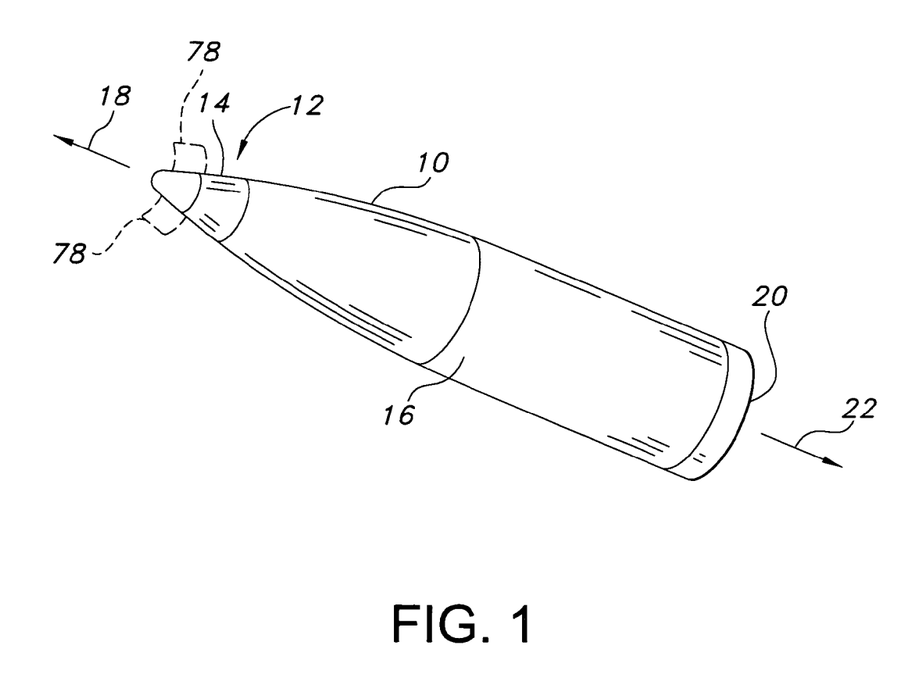
FIG. 1 is a perspective view of an artillery shell according to the invention.

The invention combines the high rotational speed of a gun-fired shell with a simple, low-cost, rugged monopole antenna to provide a robust radio direction finding capability to smart munitions. The design is a monolithic structure capable of withstanding the dynamically harsh environment of g-accelerations in excess of 10,000 g's and roll rates in excess of 21,000 revolutions per second. Referring now to FIG. 1, an artillery shell in accordance with the invention is indicated generally by reference number 10. The artillery shell 10 is typically launched or fired from a cannon, mortar, or similar type of gun (not shown). A fuse 14, which is a mechanical or electronic device used to detonate an explosive charge such as the charge of an artillery shell or similar munition, is disposed at the nose 12 of shell 10 and is typically physically contiguous with the body 16 of the shell. Shell 10, when launched or otherwise projected, travels in a forward direction 18 toward the vicinity of a target. The rear 20 of shell 10 generally points in the aft direction 22 toward the vicinity of origin of the shell, i.e. toward the gun from which the shell is launched.

Figure 2:
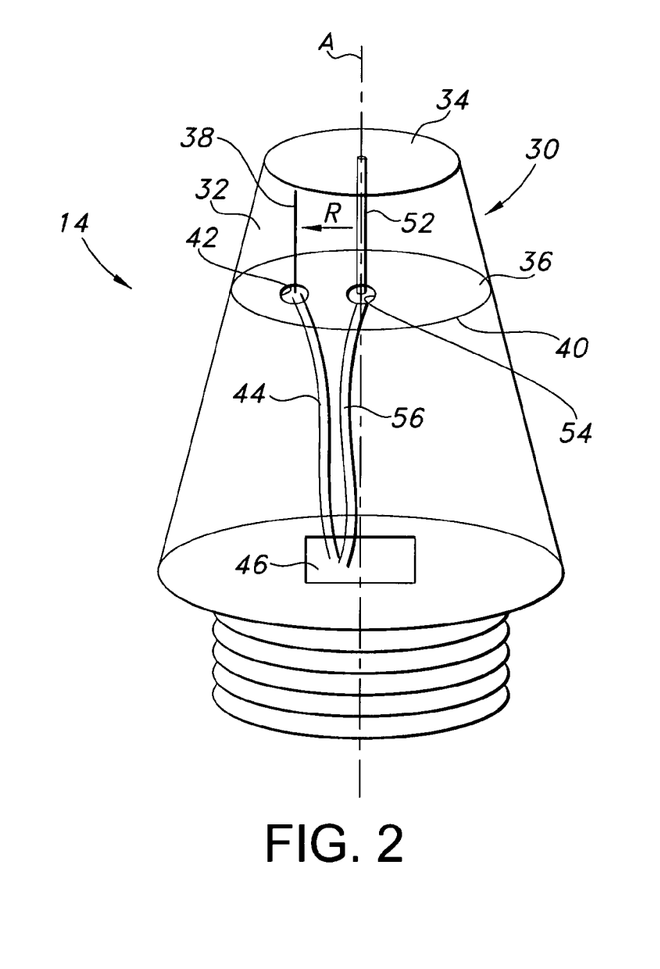
FIG. 2 is a perspective view of an artillery fuse and antenna according to the invention.

Referring now to FIG. 2, fuse 14 is shown in more detail. Fuse 14 includes an antenna 30. Antenna 30 comprises a frustum-shaped dielectric 32 having a top surface 34 and a bottom surface 36. A frustum is generally the part of a solid, such as a cone or pyramid, disposed between two usually parallel cutting planes. More specifically, a frustum is the part of a conical solid left after cutting off the top portion or vertex of the cone with a plane parallel to the base of the cone. A frustum is defined also to include any object, form, or shape symmetrically disposed about a longitudinal axis and having an outer surface definable by a line, by a conical section, or by a quadratic equation. A first radiator 38 is embedded within dielectric 32. First radiator 38 is disposed parallel to but not coincident with the central axis A of dielectric 32. Bottom surface 36 of dielectric 32 has a metallized or otherwise conductive layer 40 disposed thereon and functions as a ground plane for first radiator 38. Since conductive layer 40 functions as a ground plane, it must not be electrically connected to first radiator 38. Conductive layer 40 therefore has an aperture 42 formed therein to allow first radiator 38—or a conductor coupled to the first radiator 38—to pass therethrough. Thus, antenna 30 is a monopole antenna comprising a single radiator 38 within a dielectric 32.

The length and diameter of first radiator 38 determines the center frequency of antenna 30, and the material from which dielectric 32 is made determines the bandwidth of antenna 30. The dielectric thickness or cone length sets the input impedance. Because antenna 30 is designed to fit within a standard artillery fuse, the length of first radiator 38 should be on the order of 0.75 inches or less. In a preferred embodiment the length of first radiator 38 is roughly equal to one-quarter of the carrier wavelength for which antenna 30 is designed. For example, a first radiator length of 0.5 inches, which would easily fit within fuse 14, would have a carrier center frequency $F_c$ at approximately 5.9 GHz, or within the C-band (i.e., 4.0-6.0 GHz) of the electromagnetic spectrum. A first radiator length of 0.75 inches would have a carrier center frequency within the S-band of the electromagnetic spectrum.

To enable antenna 30 to function in a C-band radio direction finding (RDF) system, first radiator 38 is offset a radial distance R from axis A. In the embodiment shown in FIG. 2, radial distance R is about 1 centimeter. Shell 10 rotates at about 21,000 rotations per minute, or about 2199 radians per second. The high rotational speed ω of the shell produces a Doppler shift usable in an RDF system. With c as the speed of light, the Doppler phase frequency is computed as follows:

$$DopplerFrequency = \frac{R\omega F_c}{c} = \frac{(1 \text{ cm})(2199 \text{ rad/sec})(5.9 \text{ GHz})}{3\times10^8 \text{ m/sec}} = 433 \text{ Hz} \qquad \text{(Equation 1)}$$

A Doppler phase frequency of 433 Hz is significant enough to be easily instrumented according to known principles to provide the desired remote RDF capabilities.

A first transmission line 44 couples antenna 30 to electronic circuitry 46 that is disposed in fuse 14. Transmission line 44 preferably comprises a coaxial cable conductor. A known coaxial cable construction includes a center conductor with an outer shielding conductor that surrounds the center conductor. In the disclosed invention the center conductor of the coaxial cable electrically connects to first radiator 38, and the outer shielding conductor electrically connects to conductive layer 40 of antenna 30. Electronic circuitry 46 performs several functions for the antenna, including the processing of Doppler-modulated signals received by first radiator 38 to determine the presence of signals near the carrier center frequency $F_c$.

In addition to remote RDF capabilities, antenna 30 is configured to receive guidance/location and/or location/positioning information as well as the capability of communicating with a friendly base station. Fuse 14 includes a second radiator 52 that is coaxial with axis A. Top surface 34 of dielectric 32 is metallized and electrically connected to second radiator 52 to function as a capacitance hat for the second radiator. Conductive layer 40 on bottom surface 36 of dielectric 32 functions as a ground plane for second radiator 52 and is not electrically connected to the second radiator. Conductive layer 40 has an aperture 54 formed therein to allow second radiator 52—or a conductor coupled to the second radiator—to pass therethrough. Thus, antenna 30 defines a monopole antenna configured for communications and guidance and that comprises second radiator 52 with a capacitance hat at the end thereof. Normally, second radiator 52 must be of a length equal to one-quarter of the carrier wavelength to receive and transmit communications and guidance signals. However, the use of a capacitance hat allows the length of second radiator 52 to be less than one-quarter of the desired wavelength due to the effects of capacitive loading. The shorter length of second radiator 52 allows the overall size of antenna 30 to be correspondingly smaller as well, thereby facilitating the fit of antenna 30 into fuse 14.

In accordance with known principles, the length and diameter of second radiator 52 determines the center frequency of antenna 30. Antenna 30 is desirably adapted to operate at both L-band (0.5 GHz to 1.5 GHz) and S-band (2.0 GHz to 4.0 GHz) frequencies using second radiator 52. Such multi-band use of second radiator 52 may be made possible via an antenna switching apparatus (not shown) that regularly or intermittently interrupts communications on one band (such as L-band GPS reception) to communicate on the other band (such as S-band telemetry transmission and/or reception). In addition to previously mentioned factors affecting bandwidth, capacitive loading of second radiator 52, via the capacitive hat, increases the bandwidth of antenna 30, thereby allowing the antenna to be used over a greater range of frequencies.

Second radiator 52 couples to electronic circuit 46 via a second transmission line 54. As with transmission line 44, second transmission line 56 preferably comprises a coaxial cable conductor. A known coaxial cable construction includes a center conductor with an outer shielding conductor that surrounds the center conductor. In the disclosed invention the center conductor of the second transmission line electrically connects to second radiator 52, and the outer shielding conductor of the second transmission line electrically connects to ground plane 40 of antenna 30.

Figure 3:
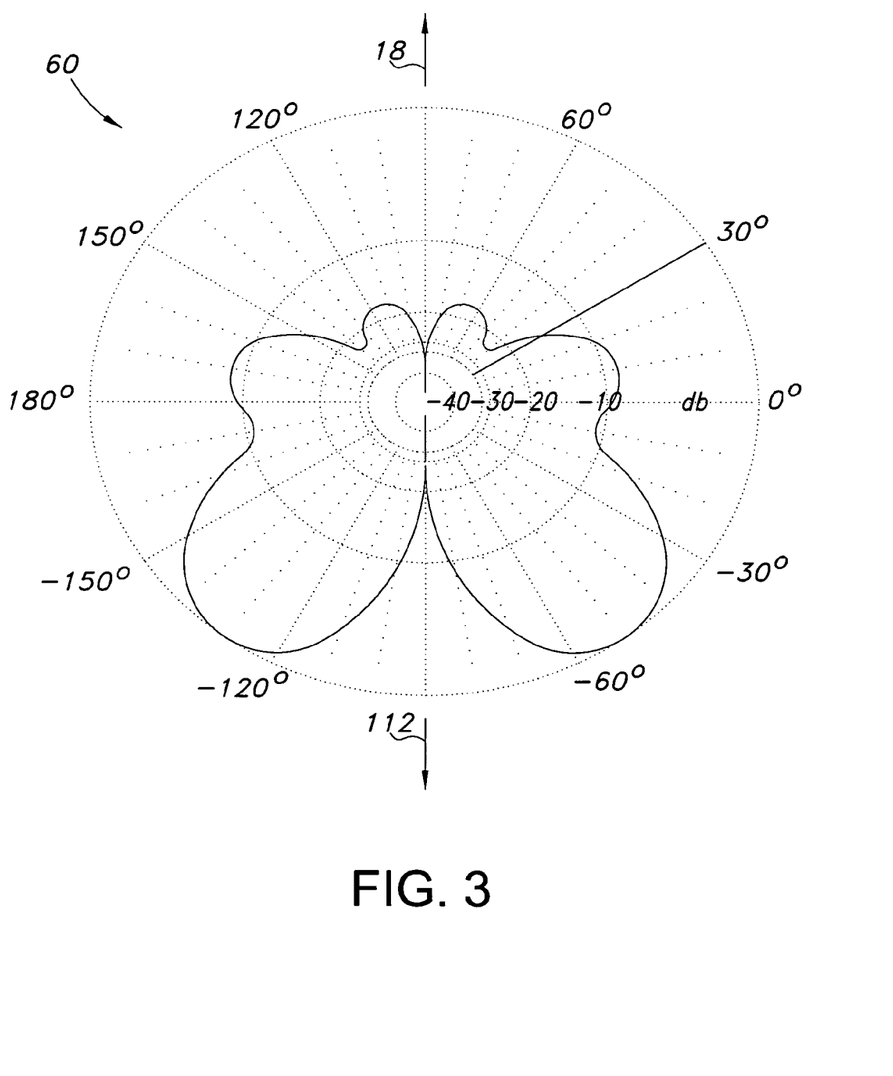
FIG. 3 is a typical elevation-plane radiation pattern of a positioning and telemetry antenna according to the invention.

FIG. 3 is an example of a possible radiation pattern 60 of the antenna of the present invention. Specifically, radiation pattern 60 represents the electric field radiation pattern of antenna 30 of FIG. 2 when transmitting or receiving a signal of a desired wavelength using second radiator 52. The electric field strength characteristics between 0 degrees to 180 degrees in the positive direction (upper portion of radiation pattern) corresponds to the forward direction 18 of travel of artillery shell 10 as shown in FIG. 1, and the electric field strength characteristics between 0 to 180 degrees in the negative direction (lower portion of radiation pattern) corresponds to the aft direction 20 of the artillery shell. As can be determined from radiation pattern 60, second radiator 52 has a relatively lower gain (greater attenuation) in the forward direction 18, and a relatively greater gain (lower attenuation) in the aft direction 20. This type of radiation pattern is desirable since communications with a base station located at the point of origin of artillery shell 10 are facilitated, while the susceptibility of second radiator 52 to jamming with a signal transmitted from the target location of the artillery shell is reduced. The desirable radiation pattern of the second radiator is further enhanced by the conductivity of the casings of fuse 14 and shell 10, whereby the radiation pattern is further "pulled" away from the forward direction 18 toward the aft direction 20. This results from the casings enhancing the effectiveness of ground plane 40. The radiation pattern for antenna 30 using first radiator 38 is similar to radiation pattern 60, but is expected to be somewhat different from radiation pattern 60.

Figure 4:
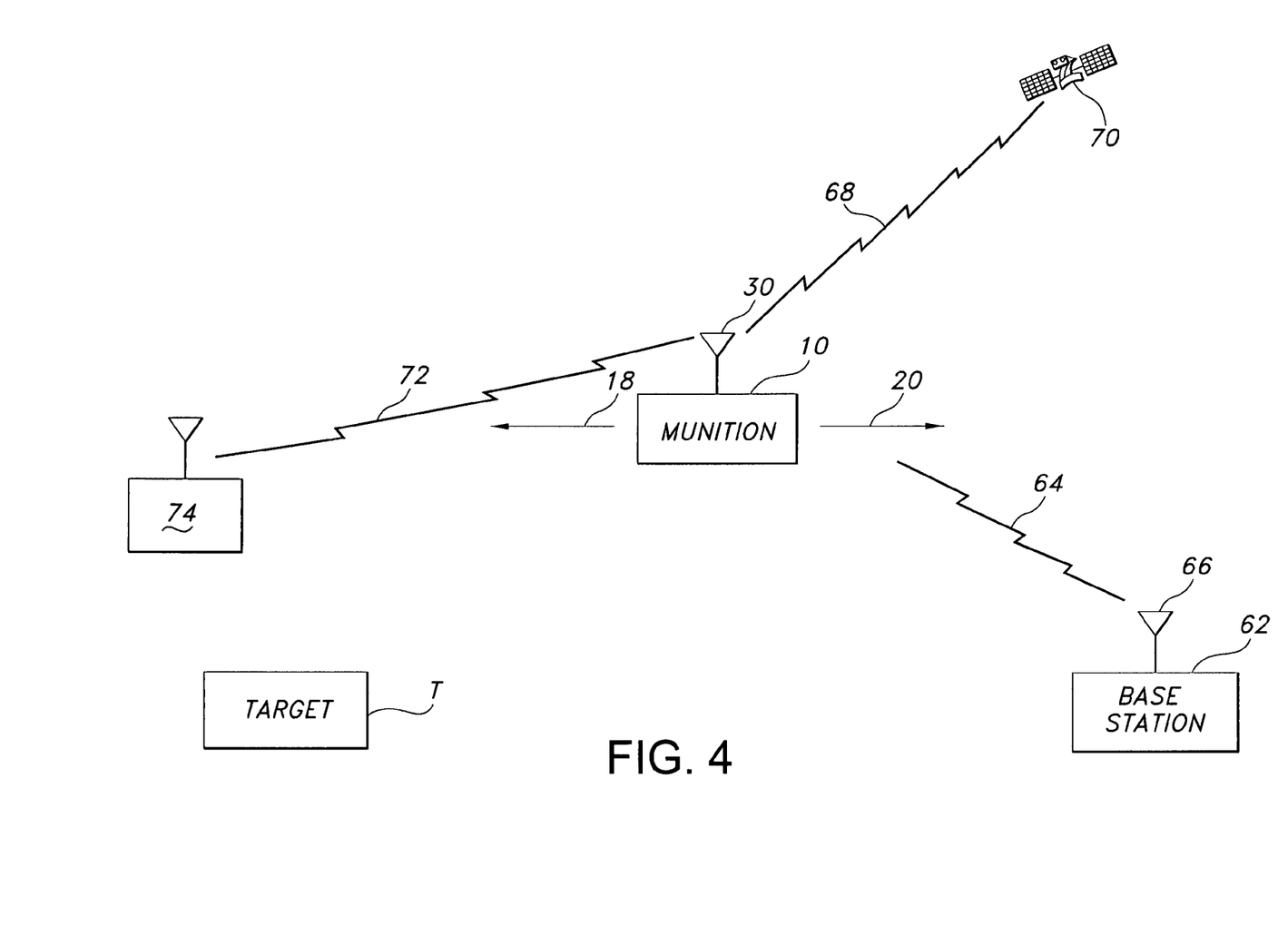
FIG. 4 is a simplified elevational view of a battlefield.

Referring now to FIG. 4, an application of the antenna of the present invention is shown. An artillery shell (munition) 10 is launched toward a target T, traveling in forward direction 18. A base station 62 is located within the vicinity of origin of shell 10 in the aft direction 20. Second radiator 52 of antenna 30 facilitates transmission of a radio-frequency telemetry signal 64 between shell 10 and a remote device such as base station 62. Base station 62 is provided with an antenna 66 for facilitating radio-frequency communications between the shell and the base station. Further, second radiator 52 of antenna 30 receives positioning signals 68 received from a plurality of space vehicles 70 in a global positioning system, only one of which is shown herein. Positioning signals 68 allow for the instantaneous position and trajectory of shell 10 to be defined and integrated with the telemetry signal 64 such that base station 62 may coordinate the guiding of shell 10 toward target T and the detonating of fuse 14.

Space vehicles 70 may be satellites in the NAVSTAR global positioning system (GPS) maintained and operated by the U.S. government. The GPS system comprises a constellation of earth orbiting space vehicles that continuously transmit telemetry signals that provide time and/or position information to a receiver capable of receiving and decoding the telemetry signals. Electronic circuitry 46 of fuse 14 therefore includes a GPS receiver such that the instantaneous position and trajectory of shell 10 may be determined. Further, electronic circuitry 46 may include a transmitter or transceiver which relays the GPS time and position information of shell 10 to base station 62 for range correction and auto-registration purposes. The signal relayed between artillery shell 10 and base station 62 may be a pseudo-lite GPS signal, for example.

While second radiator 52 of antenna 30 is receiving telemetry and positioning signals from base station 62 and space vehicles 70, first radiator 38 of antenna detects C-band or S-band radar signals 72 from a signal source 74. Signal source 74 may be a radar associated with a jamming system, a datalink such as a satellite communications datalink, a radar station not connected to a jamming system, or any other source of C-, S-, or higher frequency band transmissions. If signal source 74 is a radar associated with a jamming system, the associated radar is configured to transmit radar signals in the C or S bands to locate shell 10 so that telemetry signal to base station 62 and L-band positioning signals 68 from space vehicles 70 can be blocked. Electronic circuitry 46 calculates the precise location of the signal source 74 using GPS-obtained latitude, longitude, elevation, precise time and trajectory information for shell 10, as well as the Doppler-derived relative position of the signal source. The location of the signal source is relayed back to base station 62. The base station may instruct shell 10 to detonate in the air if the shell is sufficiently close to signal source 74. If equipped with trajectory-modifying means such as retractable flaps 78 (FIG. 1), the base station may instruct shell 10 to modify its trajectory to be closer to the signal source prior to an airborne or ground detonation. The base station may also use the location of signal source 74 to coordinate retargeting. Alternatively, the base station may only intend to probe or conduct surveillance on enemy radar systems. One or more shells 10 may be launched in a desired direction without aiming at a target T. Locations of signal sources in the C-band and/or S-band can be located for future information or destruction by subsequently launched artillery shells or by other weapons systems. Shell 10 thereby provides a C-band, S-band or higher signal surveillance means throughout the range of its flight, which can be as much as 25-30 miles.

Figure 5:
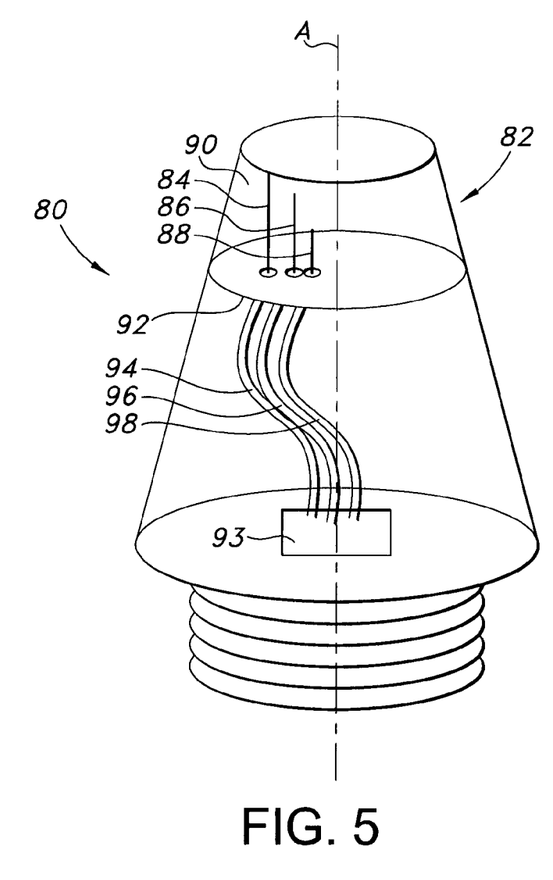
FIG. 5 is a perspective view of an artillery fuse and antenna array according to another embodiment of the invention.
Figure 6:
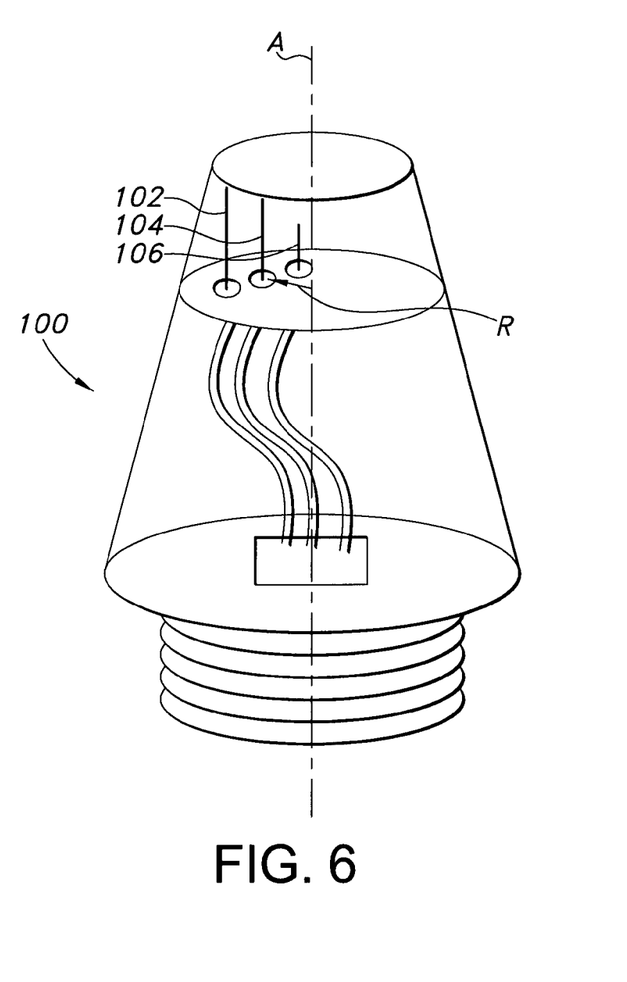
FIG. 6 is a perspective view of an artillery fuse and antenna array according to still another embodiment of the invention.

Although the invention has been described as having a single non-coaxial radiating element 38 (FIG. 2), it is possible to include multiple non-coaxial radiating elements so that RDF activity can be conducted across multiple frequencies or frequency bands. For example, FIG. 5 depicts a fuse 80 according to another embodiment of the invention in which an antenna 82 comprises first, second and third radiating elements 84, 86, 88 of various lengths embedded in a dielectric material 32. As previously explained, the length and diameter of each radiating element determines a center frequency that antenna 82 is sensitive to. The radiating elements are disposed at different radial distances from the axis of rotation A. Because the Doppler frequency (Equation 1) is partially a function of the center frequency and the radial distance between a radiating element and the axis of rotation A of fuse 80, the Doppler frequency of each radiating element will likely be different. Each radiating element 84, 86, 88, as well as the metallized bottom surface 92 of dielectric 90, are connected to an electronic circuit 93 via separate coaxial cables 94, 96, 98 as previously described. FIG. 6 depicts a fuse 100 according to a similar embodiment of the invention in which multiple radiating elements 102, 104, 106 of various lengths are disposed a common distance R from the axis of rotation A. According to Equation 1, the radiating elements 102, 104, 106 provide different Doppler frequencies due to their respective center frequencies. Of course, any number of radiating elements can be placed within the dielectric material of the various embodiments, and the radiating elements may be positioned in a radial pattern (FIG. 5), a circular pattern (FIG. 6), or any combination of the two patterns.

For the purposes of clarity, the embodiments of the invention shown in FIGS. 5 and 6 do not depict a centrally disposed antenna for communications and/or telemetry purposes, it being assumed that such an antenna, like that shown in FIG. 2 at reference number 52, would be included therein. Alternatively, one or more of the off-axis radiating elements shown in FIGS. 5 and 6 may be used for communications and/or telemetry. For example, radiating element 84 in FIG. 5 may be dedicated to communication with a base station (62 in FIG. 4). Knowing the spin rate and the instantaneous angular position of the shell in which fuse 80 is placed, communication with the base station may be accurately timed to take advantage of the strong regions of electric field pattern (60 in FIG. 3).

The invention has been described as being used to 'spot' or detect signal sources from about 2.0 GHz to about 6.0 GHz, which would include C-band (5.25 GHz to 5.925 GHz) and S-band (2.3-2.5 GHz and 2.7-3.7 GHz) signal sources such as radar and/or jamming systems. However, the invention may be used to detect, jam, and/or destroy other communications systems employing the C-band, S-band or higher frequency bands, such as one or any combination of satellite-based, airborne, or point-to-point ground-based communications systems, and the like. Furthermore, the frequencies, bandwidths, and impedances of antenna 30 may be varied by modifying the geometry, construction materials and/or techniques of fuse 14. Positioning signals 68 may be received by space vehicles other than GPS satellites, and other types of positioning systems, such as airborne or land-based pseudolites may also be used alone or in combination with space-based positioning systems. Furthermore, internal systems such as MEMS-enabled rate sensors, gyroscopes or other inertial systems can be used to augment positioning signals 68. Lastly, other types of positioning/location schemes, such as identification of location based on relative position of nearby terrain features, may serve as an alternative or supplement to GPS-type positioning solutions.

An advantage of the invention is that the RDF antenna exploits the inherent high spin rates of an artillery shell to locate potentially adversarial radar sources.

Another advantage of the invention is that the RDF antenna is easy and inexpensive to manufacture. No complex electronic antenna switching circuitry or rotational mechanical switches feeds are required.

Another advantage is that the RDF antenna is small and can be fitted into a standard artillery fuse.

Still another advantage is that the antenna can be tailored to function at various frequencies in the S-band or the C-band or higher.

Still another advantage is that the antenna can be configured to function as an array of monopoles antennas each resonant at various frequencies in the S-band or the C-band or higher which provides additional functional flexibility.

Yet another advantage is that the impedance of the RDF antenna described herein has a characteristic impedance of close to 50 Ohms. No complex transformers are therefore necessary to operate the antenna.

While the invention has been disclosed in its preferred form, the specific embodiments thereof as disclosed and illustrated herein are not to be considered in a limiting sense as numerous variations are possible. The subject matter of the invention includes all novel and non-obvious combinations and subcombinations of the various elements, features, functions and/or properties disclosed herein. No single feature, function, element or property of the disclosed embodiments is essential to all of the disclosed inventions. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the invention of the present disclosure.

What is claimed is:

1. A radio direction finding antenna, comprising:
a dielectric material configured to rotate about an axis of rotation, the dielectric material having a first conductive surface; and
a radiating element disposed within the dielectric material and electrically isolated from the first conductive surface, the radiating element positioned a distance away from the axis of rotation and configured to be resonant at a predetermined frequency;
wherein rotation of the dielectric material and radiating element about the axis of rotation causes a Doppler effect in signals received by the radiating element;
wherein the radiating element is a first radiating element, and further comprising a second radiating element disposed within the dielectric material and electrically isolated from the first conductive surface, the second radiating element being coaxial with the axis of rotation and configured to receive positioning information from a position signal source.

2. The radio direction finding antenna of claim 1, wherein the dielectric material is rotating at a rate higher than 5,000 revolutions per minute.

3. The radio direction finding antenna of claim 1, wherein the radiating element is a monopole radiator.

4. The radio direction finding antenna of claim 3, wherein the monopole radiator has a length equivalent to a quarter wavelength of the predetermined frequency.

5. The radio direction finding antenna of claim 3, wherein at least one of the distance and a length of the monopole radiator is less than one inch.

6. The radio direction finding antenna of claim 1, wherein the second radiating element is further configured to receive or send telemetry signals from a control source.

7. The radio direction finding antenna of claim 1, wherein the position signal source is a space vehicle.

8. The radio direction finding antenna of claim 1, further comprising a signal processor that determines, based upon the positioning information and the Doppler-modulated signal, a location of origin of the signal detected by the first radiating element.

9. The radio direction finding antenna of claim 1, wherein the dielectric material has a second conductive surface that electrically contacts the second radiating element, the second conductive surface configured to capacitatively lengthen an effective length of the second radiating element.

10. The radio direction finding antenna of claim 1, wherein the predetermined frequency is greater than 0.5 Gigahertz.

11. A radio direction finding antenna, comprising:
 a dielectric material configured to rotate about an axis of rotation, the dielectric material having a first conductive surface; and
 a radiating element disposed within the dielectric material and electrically isolated from the first conductive surface, the radiating element positioned a distance away from the axis of rotation and configured to be resonant at a predetermined frequency;
 wherein rotation of the dielectric material and radiating element about the axis of rotation causes a Doppler effect in signals received by the radiating element;
 wherein the radiating element is a first radiating element and the predetermined frequency is a first predetermined frequency, and further including a second radiating element disposed within the dielectric material and electrically isolated from the first conductive surface, the second radiating element configured to be resonant at a second predetermined frequency;
 wherein rotation of the dielectric material and the second radiating element about the axis of rotation causes a Doppler effect in signals received by the second radiating element.

12. The radio direction finding antenna of claim 11, wherein the second radiating element is disposed at the distance away from the axis of rotation.

13. The radio direction finding antenna of claim 11, wherein the distance is a first distance, and further wherein the second radiating element is disposed a second distance away from the axis of rotation.

14. The radio direction finding antenna of claim 1, wherein the dielectric material is disposed in a munitions fuse.

15. An artillery fuse, comprising:
 a dielectric material configured to rotate about an axis of rotation, the dielectric material having a first conductive surface; and
 a first radiating element disposed within the dielectric material and electrically isolated from the first conductive surface, the first radiating element positioned a distance away from the axis of rotation and configured to be resonant at a first predetermined frequency;
 a second radiating element disposed within the dielectric material and electrically isolated from the first conductive surface, the second radiating element configured to be resonant at a second predetermined frequency;
 wherein rotation of the dielectric material and the first and second radiating elements about the axis of rotation causes a Doppler effect in signals received by the radiating element.

16. The artillery fuse of claim 15, wherein the predetermined frequency is between about 0.4 Gigahertz and about 6.0 Gigahertz.

\* \* \* \* \*